US008285453B2

(12) United States Patent  
Schroeder et al.

(10) Patent No.: US 8,285,453 B2  
(45) Date of Patent: Oct. 9, 2012

(54) OCCUPANT BASED NAVIGATION AID LOCK-OUT FUNCTION

(75) Inventors: Jamison C. Schroeder, Birmingham, MI (US); Trevor E. Browne, Clinton Township, MI (US); Jennifer A. Senish, Sterling Heights, MI (US); Scott J. Failla, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 984 days.

(21) Appl. No.: 11/863,513

(22) Filed: Sep. 28, 2007

(65) Prior Publication Data

US 2009/0088928 A1    Apr. 2, 2009

(51) Int. Cl.  
*B60R 22/00* (2006.01)

(52) U.S. Cl. ............. 701/45; 701/36; 701/46; 701/408; 340/5.2; 340/5.5; 340/438; 340/425.5; 340/426.24; 180/268; 180/271; 180/287; 180/173

(58) Field of Classification Search ................ 701/1, 36, 701/45, 200, 408; 455/557, 411; 340/5.2, 340/5.5, 438, 425.5, 426.24; 180/268, 271, 180/287, 173  
See application file for complete search history.

(56) References Cited

U.S. PATENT DOCUMENTS

| | | | | |
|---|---|---|---|---|
| 6,029,110 A * | 2/2000 | Zuber et al. | ................... | 701/400 |
| 6,059,066 A * | 5/2000 | Lary | ............................. | 180/268 |
| 7,009,488 B2 * | 3/2006 | Schwartz et al. | ............. | 340/5.2 |
| 7,239,947 B2 * | 7/2007 | Suzuki | ............................. | 701/36 |
| 7,463,961 B2 * | 12/2008 | Powers et al. | ................... | 701/36 |
| 7,505,784 B2 * | 3/2009 | Barbera | ........................ | 455/557 |
| 7,881,940 B2 * | 2/2011 | Dusterhoff | .................... | 704/275 |
| 7,894,953 B2 * | 2/2011 | Geisler et al. | ................... | 701/36 |
| 2003/0096594 A1 * | 5/2003 | Naboulsi | ....................... | 455/411 |
| 2004/0036764 A1 * | 2/2004 | Hirota | .............................. | 348/77 |
| 2004/0056758 A1 * | 3/2004 | Schwartz | ....................... | 340/5.2 |
| 2004/0148062 A1 * | 7/2004 | Franke | ............................... | 701/1 |
| 2007/0032912 A1 * | 2/2007 | Jung et al. | ......................... | 701/1 |
| 2009/0088928 A1 * | 4/2009 | Schroeder et al. | .............. | 701/45 |

* cited by examiner

*Primary Examiner* — Redhwan k Mawari  
(74) *Attorney, Agent, or Firm* — Ingrassia Fisher & Lorenz, P.C.

(57) ABSTRACT

A vehicle navigation aid (nav-aid) system and method are provided to un-lock nav-aid functions in a moving vehicle. Sensors within the vehicle provide vehicle speed S and whether a person other the driver is present. For S greater than predetermined threshold speed $S_{th} \geq 0$, the nav-aid system remains in a locked-out state if a passenger is not present. When a passenger is present, then the system may accept some otherwise locked-out nav-aid requests. A warning and disclaimer message requiring positive acknowledgement thereof is desirable. In a preferred embodiment, the passenger should occupy a front seat and have a weight or size or both exceeding a predetermined (e.g., "adult") threshold. Desirably, navigation aid access is precluded for $S > S_{th}$ unless the occupied seat belts are latched. In a further embodiment, a user access status display indicates which nav-aid functions can be accessed depending on the vehicle status.

8 Claims, 3 Drawing Sheets

OCCUPANT BASED NAVIGATION AID LOCK-OUT FUNCTION

TECHNICAL FIELD

The present invention generally relates to an apparatus and method for setting vehicle navigation aid function accessibility and, more particularly, to an occupant dependant system and method for locking and unlocking various navigation aid functions in a moving vehicle.

BACKGROUND OF THE INVENTION

Many modern vehicles are equipped with navigation aid ("nav-aid") systems. These nav-aid systems can include position tracking (PT) capability, electronic map displays, route planning capabilities, turn-by-turn driving directions, local point of interest (POI) identification (e.g., restaurants, fuel stations, parks, entertainment, motels and hotels, etc.), and many other functions. It is common for the position tracking (PT) capability to be provided by a global positioning system (GPS) receiver built into the vehicle, but other types of PT capability can also be used (e.g., dead reckoning, local beacons, cell phones, etc.) alone or in combination with GPS. Nav-aid systems typically include a display on which the nav-aid information is presented and a user input where any of the above-listed and other types of nav-aid information may be requested by the user. The user input device can be in the form of a physical keyboard, a virtual display touch-screen based input, a rotary and/or pushbutton input method, or combinations thereof. As used herein, the terms "buttons", "keys", "keyboard" and "user input" are intended to include these and any other means by which the user can communicate with the nav-aid system.

It is important in connection with vehicle operation to avoid activities that may be distracting to the driver. Accordingly, it is common with present day nav-aid systems to limit the nav-aid functions that can be requested by a user while the vehicle is moving. This is usually accomplished by disabling the nav-aid input device or functions when the vehicle is in motion, so that the nav-aid input keys and keyboard functions are not operable. Accordingly, these disabled keys or functions are said to be "locked out." Persons of skill in the art will understand that "lock-out" may be accomplished in any numbers of ways, as for example and not intended to be limiting, by powering down the input device, by blocking the input device from sending signals to the nav-aid controller, by disabling various keys or control buttons on the input device (or input screen), or by other means. As used herein, the words "lock-out", "locked-out", "disabled" or equivalent are intended to include any means for rendering various input functions inoperable. When the vehicle stops, the lock-out is removed and the nav-aid inputs are once again enabled. While this "all or nothing" approach minimizes driver distraction related to the nav-aid system in a moving vehicle, under some circumstances it is more restrictive than may be needed. Further, under certain circumstances, such a blanket lock-out can prevent the vehicle occupants from asking for and obtaining important traffic information (e.g., detour ahead, etc.). Thus, a more flexible approach is desirable.

Accordingly, there exists an ongoing need to provide a navigation aid system and method which permits various nav-aid functions to be accessed under circumstances where driver distraction is minimal, even when the vehicle is moving. It is desirable that such a system and method, as much as possible, use existing capabilities already available in the vehicle. Other desirable features and characteristics of the present invention will become apparent from the subsequent detailed description and the appended claims, taken in conjunction with the accompanying drawings and the foregoing technical field and background.

SUMMARY OF THE INVENTION

A vehicle navigation aid (nav-aid) system and method are provided that makes it possible to un-lock various locked-out nav-aid functions in a moving vehicle. Sensors within the vehicle provide information on vehicle speed S and whether a person other the driver is present in the vehicle. For vehicle speed S greater than a predetermined threshold speed $S_{th} \geqq 0$, the nav-aid system remains in a locked-out state if a passenger is not present. When a passenger is present, then the system can accept some otherwise locked-out nav-aid requests. A warning and disclaimer message and positive acknowledgement thereof by the nav aid system user is desirable. In a preferred embodiment, the passenger should occupy a front seat and have a weight or size or both (e.g., a combination of weight and size) exceeding a predetermined (e.g., adult) threshold. In another embodiment, navigation aid access is precluded for $S > S_{th}$ unless the occupied seat belts are latched. In a still further embodiment, a user access status indicator alerts the user to which nav-aid functions can be accessed at any particular time depending on the vehicle status

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
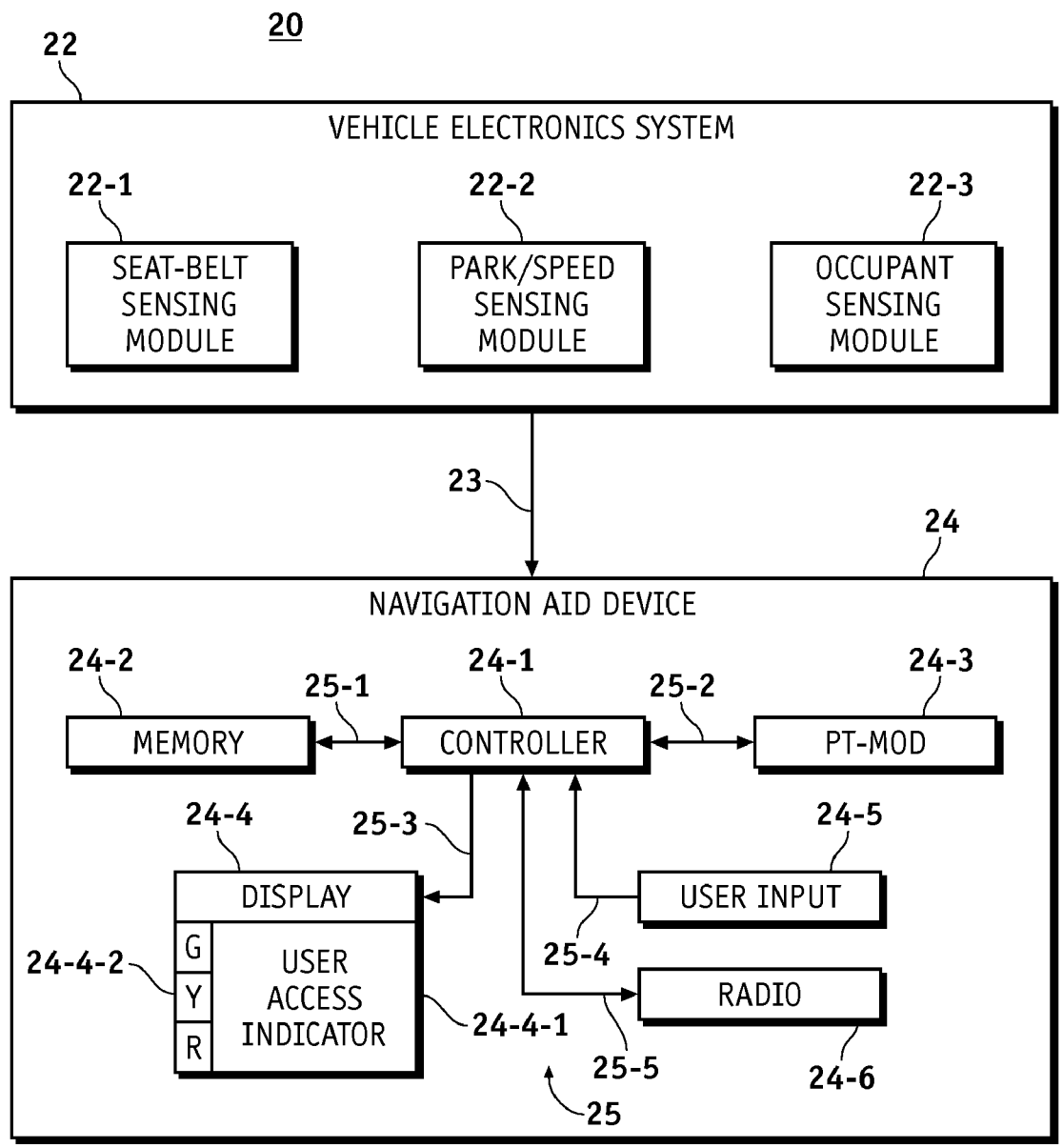
FIG. 1 is a simplified schematic diagram of a vehicle navigation aid (nav-aid) system according to the present invention, showing its relationship to various modules of the vehicle's electronics system.

FIG. 1 shows simplified schematic diagram of vehicle navigation aid (nav-aid) system 20 according to the present invention, showing the relationship of navigation aid device 24 to various sensing modules 22-1 (seat-belt sensing), 22-2 (park/speed sensing), 22-3 (occupant sensing) of vehicle electronics system 22. Vehicle electronics system 22 (and sensing modules 22-1, 22-2, 22-3 therein) and navigation aid (nav-aid) device 24 are coupled by leads or bus 23. Navigation aid (nav-aid) device 24 comprises controller 24-1, memory 24-2, position tracking module (PT-MOD) 24-3; display 24-4, user input 24-5 and optional radio 24-6. These elements are coupled by leads or busses 25, wherein leads or bus 25-1 couples controller 24-1 and memory 24-2, leads or bus 25-2 couples controller 24-1 and PT MOD 24-3, leads or bus 25-3 couples controller 24-1 and display 24-4, leads or bus 25-4 couples controller 24-1 and user input 24-5, and leads or bus 25-5 couples controller 24-1 and optional radio 24-6. Controller 24-1 controls the operation of nav-aid system 24 based on program instructions and data stored in memory 24-2, current position data received from PT-MOD 24-3, information supplied by vehicle electronics system 22 over bus 23, and information requests from user input 24-5, and presents the nav-aid results to the user on display 24-4. Display 24-4 desirably but not essentially comprises user access indicator 24-4-1 which may be manifest, for example and not intended to be limiting, as various colored lights 24-4-2 such as green (G) for unlimited access, yellow (Y) for partial access and red (R) for no access. Colored lights 24-4-2 may be a separate light bar on display 24-4 or refer to colors assumed by the various nav-aid function buttons or keys associated with user input 24-5, depending upon their access status. User input 24-5 and display 24-4 may be combined when the user input keys or buttons appear as, for example, touch sensitive buttons on display 24-4 rather than as mechanical switches on a separate user input keyboard. User access indicators 24-4-1, 24-4-2 are explained more fully in connection with FIG. 3. Radio 24-6 may be a conventional broadcast or satellite radio receiver so that nav-aid system 24 is a multi-function device, or radio 24-6 may be a WiFi transceiver so that nav-aid system 24 can maintain Internet connectivity, or radio 24-6 maybe a cell phone transceiver or emergency signaling transceiver or a combination thereof. Radio 24-6 is not essential to the present invention but may be included in further implementations.

Figure 2:
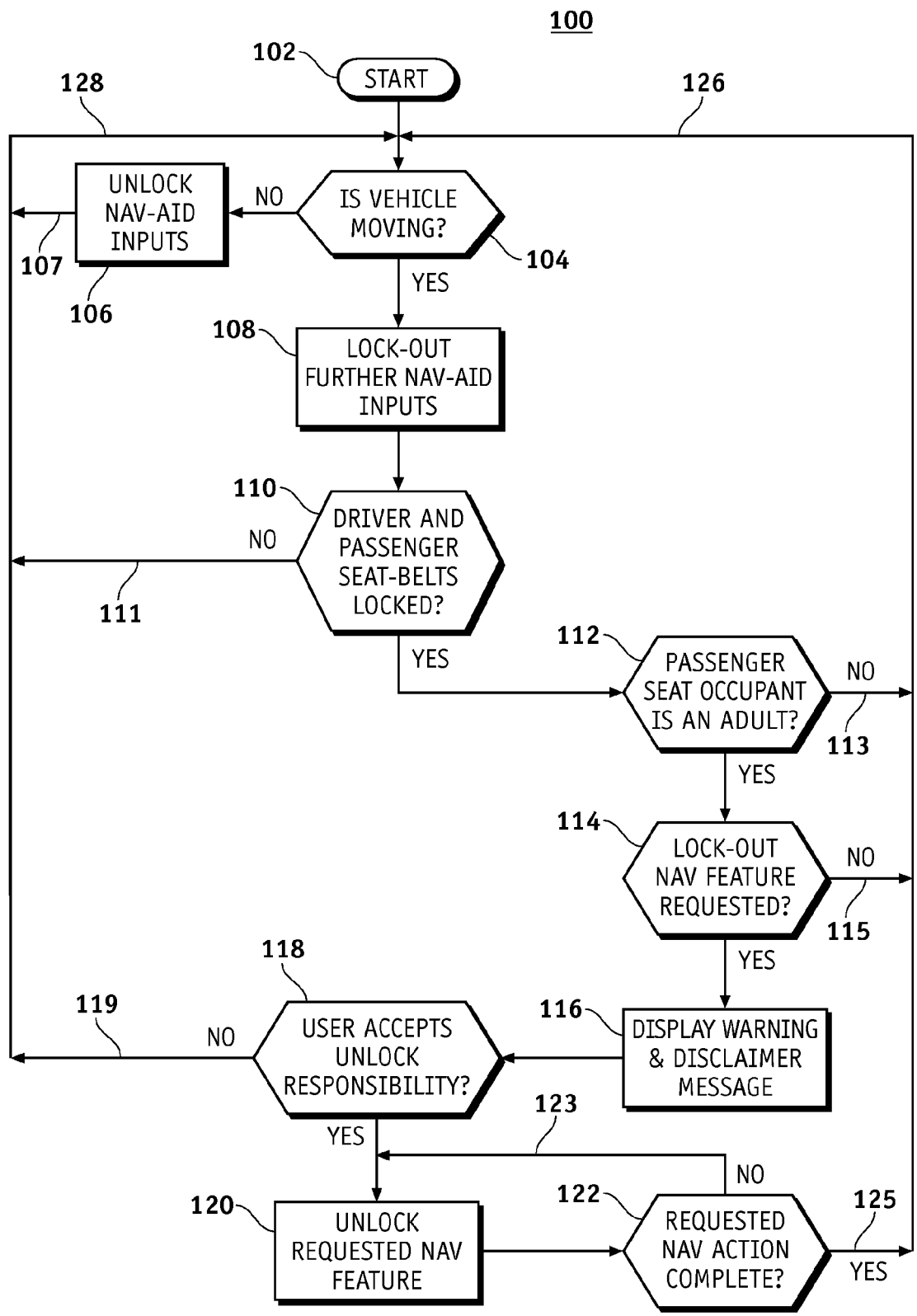
FIG. 2 is a simplified schematic flow chart illustrating a method for determining accessibility of various navigation aid (nav-aid) functions, according to a further embodiment of the invention.
Figure 3:
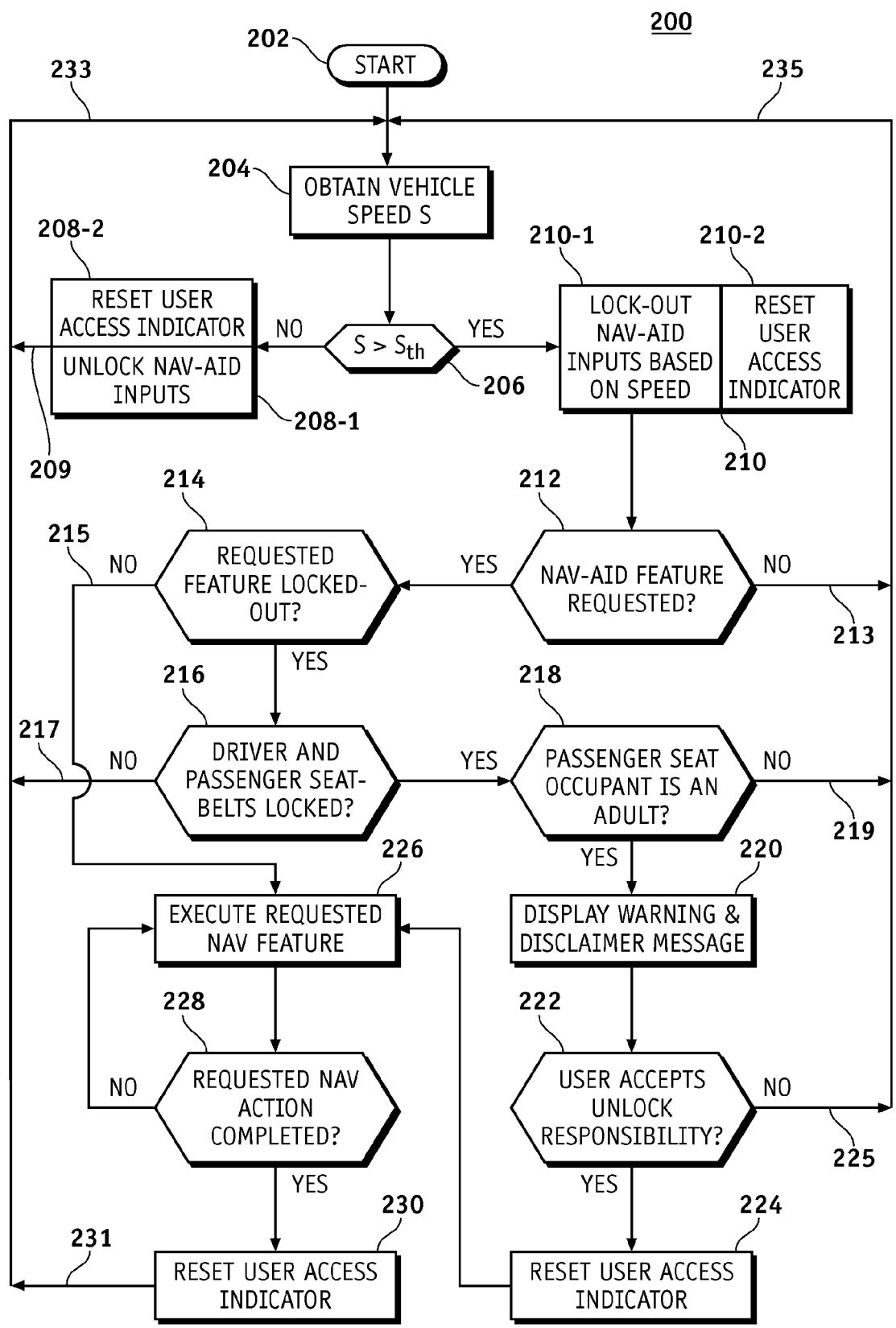
FIG. 3 is a simplified schematic flow chart illustrating a method for determining accessibility of various navigation aid (nav-aid) functions, depending on vehicle speed and occupancy and showing further details, according to a still further embodiment of the invention.

As is explained more fully in connection with FIGS. 2-3, nav-aid device 24 is adapted to receive various inputs from vehicle electronics system 22, wherein seat-belt sensing module 22-1 provides data to nav-aid device 24 on the status (e.g., latched or unlatched) of the driver and passenger(s), especially the front seat passenger(s) seat belts, occupant sensing module 22-3 provides information to nav-aid device 24 on, for example, the weight or size or both of the passenger(s), especially the front seat passenger(s), and park/speed sensing module 22-2 provides information to nav-aid device 24 on whether the vehicle is moving or parked, and/or whether the transmission is set at PARK and/or how fast the vehicle is moving, according to various embodiments. Navigation aid device 24 uses some or all of this information in determining according to various embodiments, which nav-aid function inputs are usable (accessible) and which are locked-out when the vehicle is in motion or at rest. How this information is used is explained more fully in conjunction with FIGS. 2 and 3. In a preferred embodiment, modules 22-1, 22-2, 22-3 are a part of vehicle electronics system 22 since they are useful for other purposes, but this is not essential and in further embodiments one or more thereof may be included directly in nav-aid device 24. Either arrangement is useful. What is important is that some or all of the information originating in such modules be available to controller 24-1.

FIG. 2 is a simplified schematic flow chart illustrating method 100 for determining availability of various navigation aid (nav-aid) functions of nav-aid system 20, according to further embodiments of the invention. Method 102 begins with START 102 and initial query 104, which may occur when the ignition is activated and/or the engine started. Either START arrangement is useful. In query 104 it is determined whether the vehicle is moving or not. This may be done in several ways according to different embodiments, depending upon the desires of the designer. For example, vehicle electronics system 22 can be used to send a signal to nav-aid device 24 indicating that the transmission is in PARK and/or the speed S is at or below a predetermined lockout threshold speed $S_{th}$. The predetermined lockout threshold speed $S_{th}$ may be set at zero or a small but non-zero value according to the desires of the system designer. Where it is desired that $S_{th}=0$, receiving a signal indicating that the transmission is in PARK, is equivalent to S=0. If the outcome of query 104 is NO, then method 100 proceeds to step 106 wherein some or all of the nav-aid input capabilities are unlocked, that is rendered active, so that the user may request such nav-aid functions. In general, if $S_{th}=0$, then all of the possible nav-aid functions of which system 20 is capable would be accessible, and if $S_{th}>0$ then, generally, a sub-set of such nav-aid functions may be available, according to the desires of the designer. In further embodiments, several values of $S_{th}$ may be specified, that is, $S_{th1}<S_{th2}<S_{th3}$ etc., wherein the particular sub-set of nav-aid functions that are available may be different for $S=S_{th1}$, $S=S_{th2}$, $S=S_{th3}$ etc. Following step 106, method 100 returns to START 102 as indicated by paths 107, 128. If the outcome of query 104 is YES indicating that $S>S_{th}$, then method 100 advances to step 108 is which any nav-aid features not allowed for the condition $S>S_{th}$ are locked-out, that is, nav-aid device 24 will not accept any non-allowed nav-aid requests once a YES output is obtained from query 104. Depending upon the criteria that have been established by the designer, this can mean that no nav-aid functions are accessible if the vehicle is not in PARK or if $S>S_{th}=0$ or various sub-sets of such functions can be available for $S>s_{th}$.

Following step 108, method 100 advances to query 110 in which it is determined, e.g. by examining information provided by vehicle electronics system module 22-1, whether or not both the passenger and driver seat belts are engaged, i.e., latched. If the outcome of query 110 is NO, then method 100 returns to START 102 as shown by paths 111, 128. If the outcome of query 110 is YES, then method 100 advances to query 112 wherein it is determined whether or not a passenger seat is occupied by an adult. It is generally not possible to determine the age of the person occupying the passenger seat, hence categorizing the person as an "adult" is necessarily based on some other characteristic, such as weight or size or both. Occupant sensing module 22-3 is able to determine the weight or size or both of a person occupying a passenger seat and categorize the results at least into "empty", "child" or "adult" classifications. Thus, query 112 is conveniently accomplished by determining whether or not the person occupying the passenger seat has the predetermined threshold weight or size or both expected of an "adult", where "adult" refers to a person mature enough to be able to operate nav-aid device 24 irrespective of their actual age in years. If the outcome of query 112 is NO indicating that the passenger seat is either empty or occupied by a person too light and/or too small to be considered an "adult", then method 100 returns to START 102 as shown by path 113, 126. It is preferred that seat belt sensing module 22-1 and occupant sensing module 22-3 be coupled to a front passenger seat, so that the inputs provided to nav-aid system 24 for use in queries 110 and 112 be related to the front passenger seat or seats from which a person occupying such seat or seats could more easily reach user input 24-5 of nav-aid system 24. In a further embodiment, occupant sensing module 22-3 can provide information on, for example, the distribution of weight among the various passenger seats and/or the distribution of weight in a given passenger seat as a function of time and/or in connection with a nav-aid function request. For example, and not intended to be limiting, as a passenger shifts in his or her seat in the course of entering a nav-aid function request, such change in weight distribution can be detected by sensor module 22-3 and correlated with the nav-aid function input request, thereby allowing the system to infer that a particular passenger has entered the request. This is useful in determining, for example, that a front seat passenger is operating the nav-aid device.

If the outputs of both queries 110 and 112 are YES, then method 100 advances to query 114, wherein it is determined whether or not a locked-out feature on nav-aid device 24 has been requested, e.g., via user input 24-5. If the outcome of query 114 is NO, then method 100 returns to START as shown by path 115, 126. If the output of query 114 is YES then method 100 proceeds to step 116. Query 114 is desirable but not essential. If omitted, then method 100 proceeds directly from a YES output of query 112 to step 116. In step 116 a warning and disclaimer message is presented on display 118 to tell the user that previously locked-out nav-aid functions are about to be enabled, that is, can be potentially accessed by the user provided that the user positively acknowledges the warning and disclaimer message and accepts responsibility for requesting further nav-aid functions. Method 100 proceeds to query 118 wherein it is determined whether or not the user acknowledges the warning and disclaimer message and accepts responsibility for unlocking the previously disabled nav-aid functions. The user would acknowledge the warning and disclaimer message and accept responsibility for the unlock by, for example, pressing an indicated key on the user input. This can be a mechanical key or a screen button or any other response indicator that requires a positive action by the user. If the outcome of query 118 is NO, indicating that the user did not positively execute the required acknowledgement and acceptance, then method 100 returns to START 102 as shown by path 119, 128. If the outcome of query 118 is YES, indicating that the user has executed the required acknowledgement and acceptance, then method 100 proceeds to step 120 wherein the previously locked-out nav-aid function(s) is unlocked so that the user's input entered in connection with step 114 can be executed, or if query 114 has been omitted, the user can now enter it via user input 24-5. In either case, the user requested nav-aid function is initiated in step 120. Method 100 then desirably, but not essentially, proceeds to query 122 wherein it is determined whether or not the nav-aid function initiated in step 120 has been completed in the sense that no further inputs are needed from the user. If the outcome of query 122 is NO, indicating that further input is needed from the user, then method 100 loops back to step 120 and the requested nav-aid feature remains unlocked until no further user input is needed, whereupon the outcome of query 122 becomes YES and method 100 returns to START 100 as shown by paths 125, 126. Query 122 is desirable since it insures that the unlock action provided in step 120 is temporary, that is, it expires when the need for further user input thereto ends. By returning to START 102 after the nav-aid function is complete (as far as user input is concerned) as shown by paths 125, 126, method 100 requires that the previously described conditions for enabling further nav-aid function access be satisfied. An ongoing nav-aid function (e.g., show current location on an electronic chart) initiated in step 120 may continue to run, but cannot be modified or another nav-aid function initiated unless the above described YES outcomes of queries 110, 112, 114, 118, etc., are still current or re-enabled. This is a desirable fail-safe feature.

FIG. 3 is a simplified schematic flow chart illustrating method 200 for determining accessibility of various navigation aid (nav-aid) functions, depending on vehicle speed S and occupancy and showing further details, according to still further embodiments of the invention. Method 200 begins with START 202 that can occur when the vehicle ignition is turned on and/or the engine started. Either START arrangement is useful. Method 200 proceeds to initial step 204 wherein nav-aid device 24 obtains information on vehicle speed S from, for example, park/speed sensing module 22-2 or any other convenient source. In subsequent query 206 it is determined whether or not $S>S_{th}$. The discussion in connection with query 104 of method 100 with respect to detecting whether the transmission in PARK or the vehicle is moving or stopped, can also apply here and is included by reference. If the outcome of query 206 is NO, then method 200 proceeds to step 208-1 wherein allowable nav-aid functions are unlocked and made accessible to the user via user input 24-5. At the same time or in either order, step 208-2 may also be executed wherein user access indicator 24-4-1 is reset to indicate that such nav-aid functions are accessible, for example, by causing user access indicator panel 24-4-2 to show green (G), or for example, to cause such function buttons presented on display 24-4 (where display 24-4 is also functioning as an input source) or on user input 24-5 to glow green . Following step 208-1 and optional step 208-2, method 200 returns to START 202 as shown by paths 209, 233. If the outcome of query 206 is YES (i.e., $S>S_{th}$ and/or not in PARK), then method 200 proceeds to step 210-1 wherein some or all of the nav-aid inputs are made unresponsive to the user, i.e., locked-out, and optional step 210-2 wherein the color or other user access status indicator 24-4-1, 24-4-2 is changed to indicate a lock-out condition, for example and not intended to be limiting, red (R) for full lock-out or yellow (Y) for a partial lock-out, or combinations thereof. The particular nav-aid functions that are disabled may be dependent upon the speed S, that is for example and not intended to be limiting, if speed S is high, all nav-aid input functions may be disabled (e.g., lock-out access indicator red) so that no further nav-aid requests can be entered while the high speed persists. In contrast, if the speed S is very low, then some nav aid function input requests can still remain enabled, e.g., lockout status indicator yellow. Non-limiting examples of an allowable low speed function might be, for example and not intended to be limiting, expanded traffic information, points of interest, or song listings. The earlier discussion of enabling or not enabling various sub-sets of the nav-aid functions for $S=S_{th1}$, $S=S_{th2}$, $S=S_{th3}$ etc., is incorporated herein by reference. Information on such various subsets and corresponding $S_{th}$ values are conveniently stored in memory 24-2. As noted above, disabling and enabling various nav-aid functions may be accomplished in any number of ways, such as for example and not intended to be limiting, rendering user input 24-5 inactive, interrupting the flow of commands from user input 24-5 to controller 24-1, disabling controller 24-1, and so forth. The invention does not depend upon the exact means and method chosen for enabling and/or disabling the nav-aid input functions that may be requested by the user and any means and method for doing so are intended to be included in the various embodiments.

Following step 210, method 200 proceeds to NAV-AID FEATURE REQUESTED ? query 212, wherein it is determined whether a nav-aid request has been attempted to be entered by the user. In this mode of operation, it is convenient to have user input 24-5 active in the sense that a nav-aid function request may be entered, but that such entered request is not yet executed by controller 24-1, so that the user input function overall can be considered to be still disabled. If the outcome of query 212 is NO, then method 200 returns to START 202 as shown by path 213, 235. If the outcome of query 212 is YES, then method 200 proceeds to query 214 wherein it is determined whether or not the requested nav-aid function or feature is among those that were locked out in step 210. If the outcome of query 214 is NO indicating that the requested nav-aid function or feature has not been locked out, then method 200 proceeds to EXECUTE REQUESTED NAV FEATURE step 226 where controller 24-1 executes the requested nav-aid function or feature. Query 228 follows wherein it is determined whether or not the requested nav-aid aid action has been completed as far as user input is concerned, as has already been discussed in connection with query 122 of method 100, which discussion is incorporated herein by reference. If the outcome of query 228 is NO, then method 200 cycles back to through 226 and query 228 until the outcome of query 228 is YES, whereupon method 200 proceeds to optional step 230 wherein user access indicator 24-4-1, 24-4-2 is reset to indicate that further access is blocked, e.g., condition or color red. Then method 200 returns to START 202 as shown by path 231, 233. The discussion in connection with analogous steps 120, 122 of method 100 is incorporated herein by reference.

Returning to query 214, if the outcome of query 214 is YES then method 200 proceeds to query 216 analogous to query 110 of method 100, the discussion of which is incorporated herein by reference. If the outcome of query 216 is NO, then method 200 returns to START 200 as shown by path 217, 233. If the outcome of query 216 is YES, then method 200 proceeds to query 218 wherein it is determined if the passenger seat is occupied by an "adult" (i.e., an adult weight or size or both) as that term is explained in connection with analogous query 112 of method 100, discussion of which is incorporated herein by reference. If the outcome of query 218 is NO, then method 200 returns to START 200 as shown by path 219, 235. If the outcome of query 218 is YES, the method 200 proceeds to DISPLAY WARNING & DISCLAIMER MESSAGE step 220, analogous to step 116 of method 100, discussion of which is incorporated herein by reference. Method 200 then proceeds to USER ACCEPTS UNLOCK RESPONSIBILITY ? query 222 analogous to query 118 of method 100, the discussion of which is incorporated herein by reference. If the outcome of query 222 is NO, then method 200 returns to START 200 as shown by path 225, 235. If the outcome of query 222 is YES, then method 200 optionally proceeds to RESET USER ACCESS INDICATOR step 224 to indicate that a nav-aid function can now be accessed, and then to EXECUTE REQUESTED NAV FEATURE step 226. Method 200 then proceeds to subsequent REQUESTED NAV ACTION COMPLETED ? query 228, which upon a YES outcome optionally proceeds to RESET USER ACCESS INDICATOR step 230 to indicate that further access requests are disabled (e.g., status red), and then returns to START 202 via path 231, 233, as has already been discussed. As explained in connection with steps 116, 118, 120, 122 of method 100 of FIG. 2, discussion of which has been incorporated herein by reference, analogous to steps 220, 222, 226, 230 of method 200 return to START 202 as far as further nav-aid input requests are concerned after a requested nav action is completed, i.e., requires no further inputs from the user. As previously explained, an ongoing nav-aid action (e.g., track current position on a map) that requires no further inputs from the user may continue, but further user inputs will not be honored unless queries 212 through 222 have a YES outcome. This is a desirable fail-safe feature. As noted in connection with FIG. 3, RESET USER ACCESS INDICATOR steps 208-2, 210-2, 224 and 230 are desirable but not essential. They are desirable because they provide the user with an easily visible indicator of whether nav-aid device 24 will accept further nav-aid function requests, which indicators change automatically as a function of the vehicle operating and occupancy condition. This is a desirable but not essential feature. In FIG. 1, user access indicator 24-4-1, 24-4-2 are shown as being part of display 24-4, but may also be combined with user input element 24-5 depending upon the exact nature of user input element 24-5. For example and not intended to be limiting, display 24-4 may include user input functions, e.g., user touchable on-screen function selection buttons, and user input 24-5 may include display functions, for example and not intended to be limiting, function buttons or switches whose color automatically changes as a function of whether or not they are enabled. Either arrangement or a combination thereof is useful. The discussion of using weight distribution information in determining what nav-aid functions are locked or unlocked presented in connection with method 100 is applicable to method 200 and is incorporated herein by reference.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any manner. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A navigation aid system for use in a vehicle configured to carry a driver and at least one passenger, the system comprising:
   a first sensor configured to provide information relating to vehicle movement;
   a second sensor configured to provide information indicating whether or not the at least one passenger is present in the vehicle in addition to the driver; and
   a navigation aid device coupled to the first and second sensors, and, when the first sensor detects that the vehicle is moving faster than a predetermined threshold speed the navigation aid device is adapted to lock and deny requests for navigation related information,
   wherein the navigation aid device is further configured to unlock and accept requests for navigation related information when the second sensor indicates that the at least one passenger is present in the vehicle, and
   when the first sensor detects that the vehicle is moving faster than the predetermined threshold and the second sensor does not detect the at least one passenger is present in the vehicle in addition to the driver, the navigation aid device is further configured to temporarily unlock and a accept request for navigation related information when the driver accepts responsibility for a request for further navigation aid information by positively acknowledging a disclaimer message which is presented on the navigation aid device to the driver, and the navigation aide device is further configured to relock after the navigation aide device determines that no further driver input is needed for the request.

2. The system of claim 1, wherein the vehicle is equipped with seat belts, further comprising a seat-belt engagement detector coupled to the navigation aid device, wherein the navigation aid device responds to requests for navigation related information only when seat belts of occupied seats are latched.

3. The system of claim 1, wherein the second sensor comprises a detector for determining passenger weight, or size, or weight and size, and, when the vehicle is moving, the navigation aid device responds to requests for navigation related information when the detector indicates that the passenger has a weight, or size, or weight and size exceeding a predetermined threshold weight, or size, or weight and size.

4. The system of claim 1, wherein the first sensor provides information to the navigation aid device on vehicle speed S and the navigation aid device responds to any request for navigation related information when $S \leq S_{th}$ and only responds to a limited set of requests for navigation related information when $S > S_{th}$, where $S_{th}$ is a predetermined threshold speed.

5. The system of claim 4, wherein the vehicle includes a front passenger seat and for $S > S_{th}$, the navigation aid device responds to requests for navigation related information only when the second sensor indicates that the front passenger seat is occupied.

6. The system of claim 4, wherein the navigation aid device responds to a first limited set of requests for navigation related information when $S > S_{th1}$, and responds to a second more limited set of requests for navigation related information when $S > S_{th2}$, wherein $S_{th1}$ is a first predetermined threshold speed and $S_{th2}$ is a second predetermined threshold speed greater than $S_{th1}$.

7. The system of claim 1, wherein the navigation aid device further comprises at least one indicator showing when a request for a certain type of navigation related information is allowed or locked-out.

8. The system of claim 1, wherein the vehicle includes a plurality of passenger seats and the second sensor is adapted to determine the weight distribution as a function of time in at least one of the plurality of passenger seats and transmits such information to the navigation aid device for use in determining whether access to various navigation aid functions is allowed.

* * * * *